United States Patent Office 3,830,766
Patented Aug. 20, 1974

3,830,766
SELF-EXTINGUISHING MOULDING
COMPOSITION
Hans Eberhard Praetzel, and Herbert Jenkner, Cologne,
Germany, assignors to Chemische Fabrik Kalk GmbH
No Drawing. Filed Sept. 21, 1971, Ser. No. 182,542
Claims priority, application Germany Sept. 23, 1970,
P 20 46 795.2
Int. Cl. C09k 3/28
U.S. Cl. 260—28.5 B  2 Claims

ABSTRACT OF THE DISCLOSURE

Flame-proofing acrylonitrile-butadiene-styrene (ABS) polymers by incorporating therein an aromatic bromine compound, antimony trioxide or antimony oxychloride and optionally an organo chlorine compound.

---

Polymers based on acrylonitrile, butadiene and styrene, called ABS polymers for short in the plastics industry, are achieving increasing importance in the processing sector of the industry because of their excellent physical properties, particularly their great ductile strength and resistance to aging. However, their combustibility militates against further extension of their use. Efforts to reduce this high combustibility by the addition of flame-proofing agents have now shown that the flame-proofing agents normally used often with success in the case of other plastics materials are frequently ineffective in the case of poly-acrylonitrile and polymers containing acrylonitrile.

It is of course known that ABS polymers can be rendered flame-resistant with the aid of polyvinyl chloride. In this connection it is advantageous that polyvinyl chloride and ABS polymers are thoroughly compatible with each other. However, in order to achieve satisfactory flame-proofing, considerable quantities of the PVC additive are necessary—usually more than 30%. However, the readiness with which the ABS polymers can be processed and their physical properties are adversely affected by such great quantities of the additive.

It is also known that organic bromine compounds are in many cases considerably more effective as flame-proofing agents than are the corresponding chlorine compounds, so that in a given plastics material, considerably smaller quantities of a bromine compound are necessary compared to the quantity of the corresponding chlorine compound required to provide the same flame-proofing effects. The known bromine containing flame-proofing agents have of course proved virtually ineffective in low concentrations in ABS polymers.

The problem has therefore existed of finding a flame-proofing agent which is fully effective in ABS polymers in such small quantities that the physical and the chemical properties of the plastics material are virtually not changed by this additive.

According to the present invention, a self-extinguishing moulding composition based on acrylonitrile-butadiene-styrene polymers contains simultaneously (a) an organic bromine compound, (b) an antimony compound and optionally (c) an organic chlorine compound. The compound (a) is an aromatic bromine compound having the general formula:

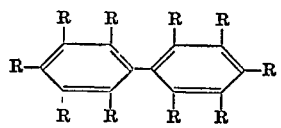

in which at least two R radicals are bromine and the remaining R radicals are short-chained alkyl radicals containing 1 to 3 carbon atoms, hydrogen or chlorine, or the general formula:

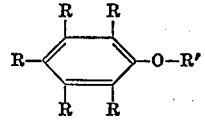

in which at least one R radical is bromine and the remaining R radicals are short-chained alkyl radicals containing 1 to 3 carbon atoms, hydrogen or chlorine, and R' is an alkyl, alkenyl, halogenoalkyl, aryl or halogenoaryl radical, or the general formula:

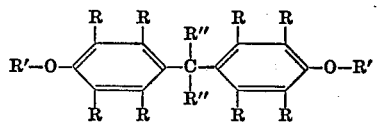

in which at least one R radical is bromine and the remaining R radicals are short-chained alkyl radicals containing 1 to 3 carbon atoms, hydrogen or chlorine, and each R' is an alkyl, alkenyl, halogenoalkyl, aryl or halogenoaryl radical, and each R" is an alkyl radical or hydrogen, The compound (b) is antimony trioxide or antimony oxychloride.

The compound (c) is a chloroparaffin containing 45 to 72 percent by weight of chlorine, a hexachlorocyclopentadiene derivative, preferably cyclo-dimerized hexachlorocyclopentadiene derivative, preferably cyclo-dimerized hexachlorocyclopentadiene, or a chlorinated polyvinyl chloride.

The quantities of the additives contained in the self-extinguishing moulding compositions of the invention, based on the total quantity of the moulding compositions are:

Compound (a) 1 to 15 percent by weight
Compound (b) 1 to 10 percent by weight
Compound (c) 0 to 5 percent by weight In the preferred embodiment (c) is present in the range of about 1–3.5 percent by weight.

Aromatic bromine compounds which, in accordance with the invention, have proved particularly suitable for the flame-proofing of ABS polymers are; octabromodiphenyl, heptabromomonochlorodiphenyl, octabromodiphenyl ether, pentabromophenylallyl ether, 2,4,6-tribromophenyl, 2,3 - dibromopropyl ether, 2,2-bis(3,5-dibromo-4-hydroxyphenyl)-propane, (tetrabromobisphenol A), 2,2-bis[4-(2,3 - dibromopropoxy)-3,5-dibromo-phenyl]-propane.

The mixing of the flame-proofing agents, to be used in accordance with the invention, with the ABS polymers can be carried out by, for example, first producing in known manner a sheet of the polymer and then working the mixture of flame-proofing agent of the invention into this sheet in a mixing mill at 180 to 190° C. After homogenization of the mixture, a semi-finished product, in the form of a granulate for example can be produced therefrom, or the finished product can be manufactured directly from the mixture.

It is however also possible, if the ABS polymer is in powder form, to mix this with the mixture of flame-proofing agent in accordance with the invention, and to process the pulverulent mixture in an extruder to produce either a granulate or to produce directly the required flame-proof mouldings.

The ABS polymers, rendered flame-resistant by the agent in accordance with the invention are protected in a twofold manner. As is well known, aliphatically or cycloaliphatically bound chlorine is released from appropriate compounds at lower temperatures than aromatically bound bromine. Therefore, ABS polymers which, in the context of the compounds named at (a) and/or (c) above, contain, in addition to compounds with aromatically bound bromine, compounds with aliphatically or cycloaliphatically bound chlorine, are protected not only against burning by a bare flame, but also against smouldering and incipient burning, where, as is well known, the temperatures are considerably lower than in the case of burning involving bare flames.

The following examples show the composition of such ABS polymers rendered flame-resistant in accordance with the invention.

|  | Contents in parts by weight | | | |
|---|---|---|---|---|
| Example | 1 | 2 | 3 | 4 |
| ABS-polymer | 150 | 150 | 150 | 150 |
| Octabromodiphenyl | 16.5 | | | |
| Heptabromomonochloro diphenyl 81.0% Br, 7.6% Cl | | 17.2 | | |
| 2,4,6-tribromophenyl-2,3-dibromopropyl ether | | | 18.0 | |
| 2,2-bis-[4-(2,3-dibromopropoxy)-3,5-dibromophenyl]-propane | | | | 14.8 |
| Chloroparaffin, 70% Cl | 2.7 | 2.7 | 2.7 | 2.7 |
| Antimony trioxide | 5.8 | 5.8 | 5.8 | 5.8 |

For the purpose of producing the flame-resistant ABS polymers as in Examples 1 to 4, the necessary quantity of pulverulent ABS polymer is mixed in a homogeneous manner with a quantity of flame-proofing agents that corresponds to the figures given in each example, the mixing taking place in a paddle mixer at room temperature. The mixture is then passed into an extruder fitted with an appropriate die, so that a continuous length of material having a cross-section of 12.5 x 12.5 mm. is produced from the raw material put into the extruder; this length of material is cut up in into test-pieces each 125 mm. in length. Thse test-pieces were tested for incendiary behavior in accordance with ASTM Specification 635. The tests revealed self-extinguishing times of below 10 seconds for all the samples.

What is claimed is:

1. A self-extinguishing moulding composition comprising an acrylonitrile-butadiene-styrene polymer, and an additive comprising:
    (a) about 1 to 15 percent by weight of an aromatic bromine compound selected from the group consisting of pentabromophenylallyl eher, 2,4,6-tribromophenyl 2,3-dibromopropyl eher, 2,2-bis(3,5-dibromo-4-hydroxyphenyl)-propane, and 2,2 - bis[4-(2,3-dibromopropoxy)-3,5-dibromo-phenyl]-propane;
    (b) about 1 to 10 percent by weight of antimony trioxide or antimony oxychloride; and
    (c) 0 to about 5 percent by weight of an organochloro compound selected from the group consisting of chloroparaffins having 45 to 72 percent by weight chlorine, hexachlorocyclopentadiene and its dimer, and chlorinated polyvinyl chloride.

2. A moulding composition according to claim 1, in which said organochloro compound is present in a range of about 1 to 3.5 percent by weight.

References Cited
UNITED STATES PATENTS

| 3,403,036 | 9/1968 | Hindersinn et al. | 106—18 |
|---|---|---|---|
| 3,347,822 | 10/1967 | Jenkner | 260—45.75 |
| 3,331,797 | 7/1967 | Kopetz et al. | 260—28.5 |
| 3,474,067 | 10/1969 | Praetzel et al. | 260—41 |
| 3,372,141 | 3/1968 | Dickerson et al. | 260—45.95 |
| 3,442,980 | 5/1969 | Grabowski | 260—880 |
| 3,527,730 | 9/1970 | Coulson et al. | 260—45.7 |
| 3,591,507 | 7/1971 | Drake et al. | 252—8.1 |
| 3,639,302 | 2/1972 | Brown et al. | 260—2.5 |
| 3,649,712 | 3/1972 | Grabowski | 260—873 |
| 3,590,014 | 6/1971 | Burt | 260—2.5 |
| 3,660,351 | 5/1972 | Schmidt et al. | 260—45.85 |
| 3,717,609 | 2/1973 | Kutner | 260—45.75 |

DONALD E. CZAJA, Primary Examiner

R. A. WHITE, Assistant Examiner

U.S. Cl. X.R.

260—45.7 R, 45.75 B, 45.95 G, 45.95 R, 876 R, 880 R